United States Patent
Kotani et al.

(10) Patent No.: US 11,286,375 B2
(45) Date of Patent: Mar. 29, 2022

(54) CONJUGATED DIENE POLYMER, RUBBER COMPOSITION, CROSSLINKED RUBBER, RUBBER PRODUCT, AND TIRE

(71) Applicant: BRIDGESTONE CORPORATION, Tokyo (JP)

(72) Inventors: Kyohei Kotani, Chuo-ku (JP); Madoka Kimura, Chuo-ku (JP)

(73) Assignee: Bridgestone Cornoration, Tokyo (JP)

( * ) Notice: Subject to any disclaimer, the term of this patent is extended or adjusted under 35 U.S.C. 154(b) by 30 days.

(21) Appl. No.: 16/540,551

(22) Filed: Aug. 14, 2019

(65) Prior Publication Data

US 2019/0367709 A1 Dec. 5, 2019

Related U.S. Application Data

(63) Continuation of application No. PCT/JP2018/003335, filed on Feb. 1, 2018.

(30) Foreign Application Priority Data

Feb. 17, 2017 (JP) .............................. JP2017-028230

(51) Int. Cl.
| | |
|---|---|
| *C08L 9/00* | (2006.01) |
| *C08L 9/06* | (2006.01) |
| *B60C 1/00* | (2006.01) |
| *C08K 3/04* | (2006.01) |
| *C08K 3/06* | (2006.01) |
| *C08K 3/22* | (2006.01) |
| *C08K 3/36* | (2006.01) |
| *C08K 5/00* | (2006.01) |
| *C08K 5/09* | (2006.01) |
| *C08L 91/00* | (2006.01) |

(52) U.S. Cl.
CPC ........ *C08L 9/06* (2013.01); *B60C 1/00* (2013.01); *C08K 3/04* (2013.01); *C08K 3/06* (2013.01); *C08K 3/22* (2013.01); *C08K 3/36* (2013.01); *C08K 5/0025* (2013.01); *C08K 5/09* (2013.01); *C08L 91/00* (2013.01); *C08K 2003/2296* (2013.01)

(58) Field of Classification Search
CPC .... C08L 47/00; C08L 9/00; C08F 4/48; C08F 236/06; C08F 2500/21; C08F 279/02
See application file for complete search history.

(56) References Cited

U.S. PATENT DOCUMENTS

| 4,433,109 | A | 2/1984 | Takeuchi et al. |
| 4,616,065 | A | 10/1986 | Hargis et al. |
| 4,981,911 | A | 1/1991 | Herrmann et al. |
| 5,100,967 | A | 3/1992 | Wolpers et al. |
| 6,180,717 | B1 | 1/2001 | Kawazura et al. |
| 6,506,862 | B2 | 1/2003 | Cabioch et al. |
| 2006/0241265 | A1* | 10/2006 | Harwood ................. C08F 2/38 526/335 |
| 2011/0146877 | A1* | 6/2011 | Tanaka ..................... C08L 7/00 152/547 |
| 2014/0187696 | A1 | 7/2014 | Cheng et al. |
| 2015/0284483 | A1* | 10/2015 | Hogan ..................... B60C 1/00 526/181 |

FOREIGN PATENT DOCUMENTS

| CN | 1495208 A | 5/2004 |
| GB | 1231657 | 5/1971 |
| JP | 47-001228 B1 | 1/1972 |
| JP | 57-109817 A | 7/1982 |
| JP | 61-238845 A | 10/1986 |
| JP | 64-043515 A | 2/1989 |
| JP | 02-247209 A | 10/1990 |
| JP | 11-29660 A | 2/1999 |
| JP | 2001-240636 A | 9/2001 |
| JP | 2002-249506 A | 9/2002 |
| JP | 2012-126795 A | 7/2012 |
| JP | 2012-1280408 A | 9/2012 |
| JP | 2013-023570 A | 2/2013 |
| JP | 2016-044255 A | 4/2016 |

OTHER PUBLICATIONS

Communication dated Jan. 23, 2020, from the European Patent Office in application No. 18754368.1.
International Search Report for PCT/JP2018/003335 dated Apr. 24, 2018 [PCT/ISA/210].
Communication dated Aug. 20, 2021 from The State Intellectual Property Office of the P.R. of China in Application No. 201880012375.6.
Chade Li et al Jul. 31, 2012, p. 326 (2 pages).

* cited by examiner

*Primary Examiner* — Gregory Listvoyb
(74) *Attorney, Agent, or Firm* — Sughrue Mion, PLLC

(57) ABSTRACT

The present invention provides a conjugated diene polymer containing a low vinyl portion having a vinyl content of 2 to 20% by mol and a high vinyl portion having a vinyl content of 50% by mol or more, and a method for producing the same; a rubber composition containing a rubber component containing the conjugated diene polymer, at least one filler selected from the group consisting of carbon black and silica, a silane coupling agent, and a crosslinking agent; crosslinked rubber prepared by crosslinking the rubber composition; and a rubber product and a tire containing the crosslinked rubber. The tire can achieve both the abrasion resistance and the low fuel consumption capability, the conjugated diene polymer, the rubber composition, and the crosslinked rubber are preferred for producing the tire, and the rubber product is excellent in abrasion resistance and low heat generation property.

8 Claims, No Drawings

CONJUGATED DIENE POLYMER, RUBBER COMPOSITION, CROSSLINKED RUBBER, RUBBER PRODUCT, AND TIRE

TECHNICAL FIELD

The present invention relates to a conjugated diene polymer, a rubber composition, crosslinked rubber, a rubber product, and a tire.

BACKGROUND ART

Various attempts have been made for enhancing the abrasion resistance and the low heat generation property of rubber products, such as a tire.

PTL 1 describes, for providing a rubber composition providing a tire that is further enhanced in low heat generation property and abrasion resistance, a rubber composition containing (A) 100 parts by mass of a rubber component containing (a-1) from 10 to 100% by mass of a modified conjugated diene polymer obtained by reacting a polymerization active end of a conjugated diene polymer with at least one of a modifier K having at least one functional group of a functional group providing a basic functional group after a hydrolysis treatment and a basic functional group having a proton protected with a group capable of being deprotected through hydrolysis, and a group having a polymer concentrating capability to a surface of a filler, and (a-2) from 90 to 0% by mass of natural rubber and/or diene synthetic rubber, (B) from 5 to 200 parts by mass of an inorganic filler, and (C) from 1 to 25% by mass based on the inorganic filler in the component (B) of a silane coupling agent having at least an atom or a functional group capable of being bonded to the inorganic filler, and a thioester group and/or a dithioester group.

PTL 2 describes, for providing a rubber composition capable of improving simultaneously the low fuel consumption capability, the processability, and the abrasion resistance in such purposes as an automobile tire, the use, as the rubber composition, of a conjugated diene polymer obtained through polymerization of a monomer containing a conjugated diene compound in the presence of an alkali metal compound or an alkaline earth metal compound, the conjugated diene polymer used having an allylsilyl group at least one of the end and the side chain of the polymer.

CITATION LIST

Patent Literatures

PTL 1: JP 2012-180408 A
PTL 2: JP 2016-44255 A

SUMMARY OF INVENTION

Technical Problem

As described above, in a rubber composition having silica mixed therein, when the vinyl content is increased in unmodified styrene-butadiene copolymer (SBR), polybutadiene (BR), and the like, the low heat generation property of the rubber is enhanced, whereas there is a tendency that the abrasion resistance of the rubber is lowered, and an expensive modifier is necessarily used for improving both the capabilities.

An object of the present invention is to provide a conjugated diene polymer, a rubber composition, and crosslinked rubber that are favorable for producing a tire achieving both the abrasion resistance and the low fuel consumption capability, a method for producing the conjugated diene polymer, a rubber product excellent in abrasion resistance and low heat generation property, and a tire that achieves both the abrasion resistance and the low fuel consumption capability.

Solution to Problem

As a result of the earnest investigations for solving the problem by the present inventors, it has been found that by changing the microscopic structure of a polymer without the use of a modifier, both the abrasion resistance and the low heat generation property of a rubber composition obtained from a rubber composition containing the polymer as a constitutional component can be achieved. The present invention has been completed based on the knowledge.

The present invention includes the following.

<1> A conjugated diene polymer containing: a low vinyl portion having a vinyl content of 2 to 20% by mol; and a high vinyl portion having a vinyl content of 50% by mol or more.

<2> The conjugated diene polymer according to the item <1>, wherein the conjugated diene polymer has an average vinyl content of 2 to 40% by mol.

<3> The conjugated diene polymer according to the item <1> or <2>, wherein the conjugated diene polymer contains the low vinyl portion in an amount of 80% by mol or more and less than 100% by mol.

<4> The conjugated diene polymer according to any one of the items <1> to <3>, wherein the conjugated diene polymer contains the high vinyl portion in an amount of more than 0% by mol and 10% by mol or less.

<5> The conjugated diene polymer according to any one of the items <1> to <4>, wherein the conjugated diene polymer has the high vinyl portion at a molecular end.

<6> The conjugated diene polymer according to any one of the items <1> to <5>, wherein the low vinyl portion contains a structure derived from butadiene.

<7> A method for producing the conjugated diene polymer according to any one of the items <1> to <6>, the method for producing the conjugated diene polymer, including: producing the low vinyl portion; and then producing the high vinyl portion.

<8> The method for producing the conjugated diene polymer according to the item <7>, wherein the vinyl amount of the low vinyl portion and the vinyl amount of the high vinyl portion are differentiated from each other by differentiating an addition amount of a randomizer used in production of the low vinyl portion and an addition amount of a randomizer used in production of the high vinyl portion from each other.

<9> The method for producing the conjugated diene polymer according to the item <8>, wherein the addition amount of the randomizer used in production of the low vinyl portion is 0.1 molar equivalent or less based on an addition amount of a polymerization initiator, and the addition amount of the randomizer used in production of the high vinyl portion is more than 0.1 molar equivalent and 2 molar equivalents or less based on an addition amount of a polymerization initiator.

<10> A rubber composition containing: a rubber component containing the conjugated diene polymer according to any one of the items <1> to <6>; at least one filler selected from the group consisting of carbon black and silica; a silane coupling agent; and a crosslinking agent.

<11> Crosslinked rubber prepared by crosslinking the rubber composition according to the item <10>.

<12> A rubber product including the crosslinked rubber according to the item <11>.

<13> A tire including the crosslinked rubber according to the item <11>.

Advantageous Effects of Invention

According to the present invention, a conjugated diene polymer, a rubber composition, and crosslinked rubber that are favorable for producing a tire achieving both the abrasion resistance and the low fuel consumption capability, a method for producing the conjugated diene polymer, a rubber product excellent in abrasion resistance and low heat generation property, and a tire that achieves both the abrasion resistance and the low fuel consumption capability can be provided.

DESCRIPTION OF EMBODIMENTS

<Conjugated Diene Polymer>

The conjugated diene polymer of the present invention contains a low vinyl portion having a vinyl content of 2 to 20% by mol and a high vinyl portion having a vinyl content of 50% by mol or more. The vinyl content may be referred simply to as a "vinyl amount".

The low vinyl portion of the conjugated diene polymer is a conjugated diene polymer molecule that is defined in the case where a randomizer is added at an arbitrary timing after the start of the polymerization, which is a unit that is formed before the addition thereof, and is a portion that has a proportion of a vinyl group of the diene monomer of 2 to 20% by mol.

The high vinyl portion thereof is a conjugated diene polymer molecule that is defined in the case where a randomizer is added at an arbitrary timing after the start of the polymerization, which is a unit that is formed after the addition thereof, and is a portion that has a proportion of a vinyl group of the diene monomer of 50% by mol or more.

Due to the presence of the high vinyl portion of the conjugated diene polymer, in the case where the conjugated diene polymer of the present invention is used as a rubber component of a rubber composition containing a filler and a silane coupling agent, the reactivity with the silane coupling agent can be enhanced to enhance the dispersibility of the filler (particularly silane), resulting in the enhancement of the low heat generation property of the crosslinked rubber. Furthermore, due to the presence of the low vinyl portion of the conjugated diene polymer, the abrasion resistance of the crosslinked rubber can be suppressed from being decreased.

The vinyl content of the high vinyl portion is preferably from 50 to 100% by mol, and more preferably from 60 to 75% by mol, from the standpoint of the enhancement of the reactivity with the silane coupling agent. The vinyl content of the low vinyl portion is preferably from 3 to 18% by mol, more preferably from 4 to 15% by mol, and further preferably from 4 to 13% by mol, from the standpoint of further suppressing the decrease of the abrasion resistance of the crosslinked rubber.

The vinyl content of the high vinyl portion and the vinyl content of the low vinyl portion may be calculated in such a manner that a part of the cement is collected before starting the formation of the high vinyl portion, and the addition rate of the monomer and the vinyl amount obtained by the $^1$H-NMR spectrum at this time are used, and compared to the values thereof after completing the polymerization.

The conjugated diene polymer preferably contains the low vinyl portion in an amount of 80% by mol or more and less than 100% by mol and the high vinyl portion in an amount of more than 0% by mol and 10% by mol or less, in one molecule. That is, the proportion of the low vinyl portion occupied in the molecule is preferably larger than the proportion of the high vinyl portion. In the case where the proportion of the low vinyl portion occupied in the molecule is 80% by mol or more, the abrasion resistance of the crosslinked rubber can be further suppressed from being decreased.

The conjugated diene polymer more preferably contains the low vinyl portion in an amount of 90 to 99% by mol, and further preferably in an amount of 92 to 98% by mol. The conjugated diene polymer preferably contains the high vinyl portion in an amount of 1 to 10% by mol, and further preferably in an amount of 2 to 8% by mol.

The conjugated diene polymer preferably contains only the low vinyl portion and the high vinyl portion.

The content of the high vinyl portion and the content of the low vinyl portion in the conjugated diene polymer may be calculated in such a manner that a part of the cement is collected before starting the formation of the high vinyl portion, and the addition rate of the monomer and the conversion after completing the polymerization are compared.

The positions of the low vinyl portion and the high vinyl portion in the conjugated diene polymer are not particularly limited. The molecular chain of the conjugated diene polymer may be formed by bonding the low vinyl portion and the high vinyl portion alternately, or may be formed by positioning the low vinyl portion at the center of the molecular chain with the high vinyl portion positioned at both ends or one end of the molecular chain, or in contrast by positioning the high vinyl portion at the center of the molecular chain with the low vinyl portion positioned at both ends or one end of the molecular chain.

As described above, the conjugated diene polymer preferably has a proportion of the low vinyl portion occupied in the molecule of 80% by mol or more. In this standpoint, it is preferred that the molecular chain of the low vinyl portion constitutes the main skeleton as the center of the molecular chain of the conjugated diene polymer, and the molecular chain of the high vinyl portion is positioned at the molecular end (i.e., one end or both ends) of the conjugated diene polymer. In the case where the conjugated diene polymer has the high vinyl portion at the molecular end in this manner, in the rubber composition containing the conjugated diene polymer of the present invention as a rubber component and containing a filler and a silane coupling agent, the dispersibility of the filler (particularly silane) in the rubber composition can be enhanced.

The conjugated diene polymer preferably has an average vinyl content of 2 to 40% by mol. In the case where the average vinyl content of the conjugated diene polymer is 2% by mol or more, the low heat generation property thereof can be suppressed form being decreased, and in the case where the average vinyl content thereof is 40% by mol or less, the abrasion resistance thereof can be suppressed from being decreased. In this standpoint, the average vinyl content of the conjugated diene polymer is more preferably from 5 to 30% by mol, and further preferably from 7 to 20% by mol.

The average vinyl content of the conjugated diene polymer may be measured by $^1$H-NMR spectrum.

The conjugated diene polymer preferably has a number average molecular weight (Mn) of 100,000 to 1,000,000, and more preferably from 250,000 to 500,000, from the standpoint of the balance of the processability, the abrasion resistance, and the low heat generation property.

In the following description, the number may be expressed with omission of the last three digits in some cases, for example, 180,000 may be shown as "180 k", and 450,000 may be shown as "450 k".

The number average molecular weight of the conjugated diene polymer may be obtained in terms of standard polystyrene conversion value by gel permeation chromatography (GPC) measurement.

In the present invention, the conjugated diene polymer may be a homopolymer of a conjugated diene compound, or may be a copolymer containing an unconjugated olefin compound or an aromatic vinyl compound as a copolymerization component, i.e., may be a copolymer of a conjugated diene compound and an unconjugated olefin compound or a copolymer of a conjugated diene compound and an aromatic vinyl compound.

The polymer may be polymerized through anion polymerization or may be polymerized through coordination polymerization.

The monomer of the conjugated diene compound is not particularly limited, and may be appropriately selected depending on the purpose, and examples thereof include an alicyclic monomer, such as 1,3-butadiene, isoprene, 1,3-pentadiene, 2,3-dimethyl-1,3-butadiene, and 1,3-hexadiene, and an aromatic vinyl monomer, such as styrene, a-methylstyrene, p-methylstyrene, vinyltoluene, and vinylnaphthalene. These compounds may be used alone or as a combination of two or more kinds thereof.

The unconjugated olefin compound is not particularly limited, and may be appropriately selected depending on the purpose, and examples thereof include ethylene, propylene, 1-butene, 1-pentene, 1-hexene, 1-heptene, and 1-octene. These compounds may be used alone or as a combination of two or more kinds thereof.

The aromatic vinyl compound is not particularly limited, and may be appropriately selected depending on the purpose, and examples thereof include styrene, a-methylstyrene, 1-vinylnaphthalene, 3-vinyltoluene, ethylvinylbenzene, divinylbenzene, 4-cyclohexylstyrene, and 2,4,6-trimethylstyrene. These compounds may be used alone or as a combination of two or more kinds thereof.

The low vinyl portion and the high vinyl portion each may be a molecular chain derived from the monomer of the conjugated diene compound, and the kind of the monomer is not limited. The low vinyl portion preferably contains a structure derived from butadiene from the standpoint of the abrasion resistance of the crosslinked rubber. The high vinyl portion preferably contains one or both of a structure derived from isoprene and a structure derived from butadiene, and more preferably contains a structure derived from butadiene, from the standpoint of the enhancement of the reactivity with a silane coupling agent.

<Method for producing Conjugated Diene Polymer>

The method for producing the conjugated diene polymer of the present invention is not particularly limited, as far as the production method is capable of producing a homopolymer of a conjugated diene compound or a copolymer thereof with a copolymerization component, and is capable of making the low vinyl portion and the high vinyl portion described above contained therein.

Examples of the production method of efficiently introducing the low vinyl portion and the high vinyl portion having the particular vinyl contents to the molecular chain include a reaction by anion polymerization of the conjugated diene compound alone or the conjugated diene compound and the copolymerization component, in an organic solvent with a lithium compound as a polymerization initiator.

The lithium compound used as the initiator of the anion polymerization is not particularly limited, and a hydrocarbyl lithium is preferably used. The use of a hydrocarbyl lithium as the polymerization initiator may provide a conjugated diene polymer having a hydrocarbyl group at the polymerization initiation end and having a polymerization active moiety at the other end.

The hydrocarbyl lithium preferably has a hydrocarbyl group having from 2 to 20 carbon atoms, examples of which include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, and a reaction product of diisopropenylbenzene and butyl lithium, and n-butyl lithium is particularly preferred among these.

The method of producing the conjugated diene polymer through anion polymerization by using a lithium compound as a polymerization initiator is not particularly limited, and a known method may be used.

Specifically, in an organic solvent that is inert to the reaction, for example a hydrocarbon solvent, such as aliphatic, alicyclic, and aromatic hydrocarbon compounds, the conjugated diene compound, or the conjugated diene compound and an aromatic vinyl compound may be subjected to anion polymerization with the lithium compound as a polymerization initiator, in the presence of a randomizer, which may be used depending on necessity, and thereby the target conjugated diene polymer having an active end can be obtained.

The hydrocarbon solvent preferably has from 3 to 8 carbon atoms, examples of which include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These compounds may be used alone or as a mixture of two or more kinds thereof.

The monomer concentration in the solvent is preferably from 5 to 50% by mass, and more preferably from 10 to 30% by mass.

The randomizer is a compound having a function, for example, the control of the microscopic structure of the conjugated diene polymer, such as increase of the 1,2-bond of the butadiene moiety in the butadiene-styrene copolymer and the 3,4-bond in the isoprene polymer, and the control of the compositional distribution of the monomer units in the conjugated diene compound-aromatic vinyl compound copolymer, such as the randomization of the butadiene unit and the styrene unit of the butadiene-styrene copolymer. The randomizer is not particularly limited, and any compound may be appropriately selected and used from known compounds that have been ordinarily used as a randomizer.

Specific examples thereof include an ether compound and a tertiary amine compound, such as dimethoxybenzene, tetrahydrofuran, dimethoxyethane, diethylene glycol dibutyl ether, diethylene glycol dimethyl ether, an oxolanylpropane oligomer, represented by 2,2-bis(2-tetrahydrofuryl)propane, triethylamine, pyridine, N-methylmorpholine, N,N,N',N'-tetramethylethylenediamine, and 1,2-dipiperidinoethane. A potassium salt compound, such as potassium tert-amylate and potassium tert-butoxide, and a sodium salt compound, such as sodium tert-amylate, may also be used.

Among these, 2,2-bis(2-tetrahydrofuryl)propane (OOPS) is preferred.

The randomizer may be used alone or as a combination of two or more kinds thereof. The amount of the randomizer used is preferably selected from a range of 2 molar equivalents or less (including 0 molar equivalent) per 1 mol of the lithium compound.

The temperature in the polymerization reaction of the conjugated diene polymer is preferably selected from a range of 0 to 150° C., and more preferably from 20 to 130° C. The polymerization reaction may be performed under the generated pressure, and in general, it is preferred to perform the operation under a pressure that is sufficient for retaining the monomer to a substantially liquid phase. Specifically, while the pressure depends on the substances to be polymerized, the polymerization solvent used, the polymerization temperature, and the like, a higher pressure may be used depending on necessity, and such a pressure may be obtained by an appropriate method, such as pressurization of the reactor with a gas that is inert to the polymerization reaction.

The conjugated diene polymer of the present invention has a low vinyl portion having a vinyl content of 2 to 20% by mol, and a high vinyl portion having a vinyl content of 50% by mol or more, and therefore has different vinyl contents between the low vinyl portion and the high vinyl portion. For providing the polymer having portions that are different in vinyl content, it is preferred that the low vinyl portion is produced, and then the high vinyl portion is produced. From the same standpoint, it is preferred that the addition amount of the randomizer used in production of the low vinyl portion and the addition amount of the randomizer used in production of the high vinyl portion are differentiated from each other, so as to differentiate the vinyl amount of the low vinyl portion and the vinyl amount of the high vinyl portion.

In the case where the vinyl content of the low vinyl portion in the conjugated diene polymer is to be increased, the randomizer may be added to the reaction vessel before the addition of the lithium compound. With a smaller addition amount of the randomizer, the vinyl content of the low vinyl portion of the conjugated diene polymer tends to decrease. The randomizer added is preferably OOPS. The addition amount of the randomizer used in production of the low vinyl portion is preferably 0.1 molar equivalent or less (including 0 molar equivalent) with respect to the addition amount of the polymerization initiator. For example, in the case where the lithium compound is used as the polymerization initiator, the addition amount of the randomizer is preferably 0.1 molar equivalent or less (including 0 molar equivalent) per 1 mol of the addition amount of the lithium compound. The addition amount of the randomizer used in production of the low vinyl portion is more preferably from 0 to 0.08 molar equivalent, and further preferably from 0 to 0.05 molar equivalent, with respect to the addition amount of the polymerization initiator.

In the case where the vinyl content of the high vinyl portion in the conjugated diene polymer is to be increased, the randomizer may be added during the polymerization, and with a larger addition amount of the randomizer, the vinyl content of the high vinyl portion tends to increase. In this case, also, the randomizer added is preferably OOPS. The addition amount of the randomizer used in production of the high vinyl portion is preferably more than 0.1 molar equivalent and 2 molar equivalents or less with respect to the addition amount of the polymerization initiator. The addition amount of the randomizer used in production of the high vinyl portion is more preferably from 0.3 to 1.8 molar equivalents, and further preferably from 0.5 to 1.5 molar equivalents, with respect to the addition amount of the polymerization initiator.

In the case where the proportion of the low vinyl portion in the conjugated diene polymer is to be increased, the time of the addition of the randomizer may be delayed. Specifically, it is preferred that the randomizer added in the start of the polymerization is OOPS and added in an amount of 0.1 molar equivalent with respect to the lithium compound, and within a period of 60 to 80 minutes from the start of the polymerization, OOPS as a randomizer is added in an amount of 1 molar equivalent or more.

<Rubber Composition>

The rubber composition of the present invention contains: a rubber component containing the conjugated diene polymer of the present invention; at least one filler selected from the group consisting of carbon black and silica; a silane coupling agent; and a crosslinking agent.

The rubber composition contains the conjugated diene polymer of the present invention having the low vinyl portion excellent in abrasion resistance and being excellent in reactivity with the silane coupling agent, and thereby the dispersibility of the filler in the rubber composition can be enhanced to provide crosslinked rubber excellent in low heat generation property.

The rubber composition may further contain various components, such as a crosslinking accelerator and an antiaging agent.

[Rubber Component]

The rubber component contains at least the conjugated diene polymer of the present invention, and may further contain an additional rubber component other than the conjugated diene polymer of the present invention.

Examples of the additional rubber component include natural rubber, polyisoprene, a styrene-butadiene copolymer (SBR), acrylonitrile-butadiene rubber (NBR), chloroprene rubber, ethylene-propylene rubber (EPM), ethylene-propylene-unconjugated diene rubber (EPDM), polysulfide rubber, silicone rubber, fluorine rubber, and urethane rubber. These materials may be used alone or as a mixture of two or more kinds thereof.

The additional rubber component is preferably natural rubber, polyisoprene, or a styrene-butadiene copolymer (SBR), from the standpoint of the co-crosslinking property.

The proportion of the conjugated diene polymer of the present invention in the rubber component is preferably from 30 to 100% by mass, and more preferably from 50 to 100% by mass.

[Filler]

The filler contains at least one selected from the group consisting of carbon black and silica.

The carbon black is not particularly limited, and arbitrary one may be appropriately selected and used from those having been used as a filler for rubber. Examples thereof used include SRF, GPF, FEF, HAF, ISAF, and SAF, and preferably include FEF, HAF, ISAF, and SAF, which are excellent particularly in abrasion resistance, and the carbon black preferably has a nitrogen adsorption specific surface area $N_2SA$ (according to JIS K6217-2:2001) of 30 to 150 $m^2/g$, more preferably from 35 to 150 $m^2/g$, and further preferably from 35 to 130 $m^2/g$.

The carbon black may be used alone or as a combination of two or more kinds thereof.

Examples of the silica include wet method silica (hydrated silica), dry method silica (anhydrous silica), calcium silicate, and aluminum silicate, and among these, wet method silica is preferred.

The wet silica preferably has a BET specific surface area (measured according to ISO 5794/1) of 40 to 350 $m^2/g$. The silica having a BET specific surface area within the range has an advantage that both the rubber reinforcing capability and the dispersibility to the rubber component can be achieved. From the standpoint, the silica having a BET specific surface area in a range of 80 to 300 $m^2/g$ is more preferred. Examples of the silica include commercially available products, such as "Nipsil AQ" and "Nipsil KQ", produced by Tosoh Silica Corporation, and "Ultrasil VN3", produced by Degussa AG.

The silica may be used alone or as a combination of two or more kinds thereof.

In the rubber composition of the present invention, the amount of the filler mixed that is at least one selected from the carbon black and the silica is preferably from 1 to 120 parts by mass, and more preferably from 5 to 100 parts by mass, per 100 parts by mass of the rubber component from the standpoint of the enhancement of the abrasion resistance of the crosslinked rubber.

In the case where the carbon black and the silica are mixed and used, the amount of the carbon black is preferably from 1 to 60 parts by mass, and more preferably from 5 to 30 parts by mass, per 100 parts by mass of the rubber component, and the amount of the silica is preferably from 30 to 100 parts by mass, and more preferably from 50 to 90 parts by mass, per 100 parts by mass of the rubber component.

[Silane Coupling Agent]

The rubber composition of the present invention contains a silane coupling agent from the standpoint of the further enhancement of the reinforcing capability of the crosslinked rubber with the filler (particularly silica).

Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Among these, a bis(3-triethoxysilylpropyl) polysulfide and 3-trimethoxysilylpropylbenzothiazolyl tetrasulfide are preferred from the standpoint of the improvement of the reinforcing capability.

The silane coupling agents may be used alone or as a combination of two or more kinds thereof.

In the rubber composition of the present invention, the amount of the silane coupling agent mixed is preferably selected from a range of 2 to 20 parts by mass per 100 parts by mass of the filler (preferably 100 parts by mass of the silica) while the amount may vary depending on the kind of the silane coupling agent, and the like. In the case where the amount is 2 parts by mass or more, the effect of the coupling agent may be sufficiently exhibited, and in the case where the amount is 20 parts by mass or less, the rubber component can be suppressed from being gelled. The amount of the silane coupling agent mixed is more preferably from 5 to 15 parts by mass per 100 parts by mass of the filler (preferably 100 parts by mass of the silica) from the standpoint of the effect of the coupling agent and the prevention of gelation.

[Crosslinking Agent]

The crosslinking agent is not particularly limited and may be appropriately selected depending on the purpose, and examples thereof include a sulfur crosslinking agent, an organic peroxide crosslinking agent, an inorganic crosslinking agent, a polyamine crosslinking agent, a resin crosslinking agent, a sulfur compound crosslinking agent, and an oxime-nitrosamine crosslinking agent. In the case where the rubber composition of the present invention is used as a tire, a sulfur crosslinking agent (vulcanizing agent) is preferably used among the above.

The content of the crosslinking agent in the rubber composition is not particularly limited and may be appropriately selected depending on the purpose, and the content thereof is preferably from 0.1 to 20 parts by mass per 100 parts by mass of the rubber component. In the case where the content of the crosslinking agent is 0.1 part by mass or more, the crosslinking may proceed favorably, and in the case where the content thereof is 20 parts by mass or less, the crosslinking may be suppressed from proceeding during kneading, so as to provide a crosslinked product having favorable properties.

[Additional Mixing Component]

The rubber composition of the present invention may contain various chemicals generally used in the field of rubber industries, such as a crosslinking accelerator, an antiaging agent, an antiscorching agent, zinc oxide, and stearic acid, depending on necessity within a range that does not impair the object of the present invention.

(Crosslinking Accelerator)

The crosslinking accelerator (which may be referred to as a vulcanization accelerator in the case where the crosslinking agent is a vulcanizing agent) capable of being used in the present invention is not particularly limited, and examples of the crosslinking accelerator include a thiazole compound, such as M (2-mercaptobenzothiazole) and DM (dibenzothiazyl sulfide), a sulfenamide compound, such as CZ (N-cyclohexyl-2-benzothiazolyl sulfenamide), TBBS (N-(tert-butyl)-2-benzothiazolyl sulfenamide), DZ (N,N-dicyclohexyl-2-benzothiazolyl sulfenamide), and NOBS (N-oxydiethylene-2-benzothiazolyl sulfenamide), and a guanidine compound, such as DPG (1,3-diphenylguanidine).

The amount of the crosslinking accelerator mixed in the rubber composition is preferably from 0.1 to 5.0 parts by mass, and more preferably from 0.2 to 3.0 parts by mass, per 100 parts by mass of the rubber component.

(Antiaging Agent)

Examples of the antiaging agent capable of being used in the rubber composition of the present invention include 3C (N-isopropyl-NP-phenyl-p-phenylenediamine), 6C (N-(1,3-dimethylbutyl)-N'-phenyl-p-phenylenediamine), a 2,2,4-trimethyl-1,2-dihydroquinoline polymer, AW (6-ethoxy-2,2,4-trimethyl-1,2-dihydroquinoline), and a high temperature condensate of diphenylamine and acetone.

The amount of the antiaging agent used is preferably from 0.1 to 6.0 parts by mass, and more preferably from 0.3 to 5.0 parts by mass, per 100 parts by mass of the rubber component.

<Method for producing Rubber Composition>

The rubber composition of the present invention may be prepared by kneading the components contained in the rubber composition with a kneading equipment, such as a Banbury mixer, a roll, and an internal mixer.

The components of the rubber composition may be kneaded in one stage or in plural stages, and is preferably kneaded in two stages including the first stage of kneading the components of the rubber composition except for the zinc compound, the crosslinking accelerator, and the crosslinking agent, and the second stage of kneading the resulting kneaded product with the zinc compound, the crosslinking accelerator, and the crosslinking agent added thereto. Furthermore, a viscosity controlling stage for controlling the viscosity of the kneaded product, of kneading the components without the addition of component may be provided between the first stage of kneading and the second stage of kneading.

<Crosslinked Rubber>

The crosslinked rubber of the present invention is prepared by crosslinking the rubber composition of the present invention.

The crosslinking condition is not particularly limited and may be appropriately selected depending on the purpose, and it is preferred that the temperature is from 120 to 200° C., and the heating time is from 1 to 900 minutes.

<Rubber Product and Tire>

The crosslinked rubber of the present invention may be applied to various rubber products, such as a tire, antivibration rubber, seismic isolation rubber, a belt for a belt conveyer or the like, a rubber crawler, and various kinds of hose.

For example, in the case where the crosslinked rubber of the present invention is applied to a tire, the structure of the tire is not particularly limited, as far as the rubber composition of the present invention is used therein, and may be appropriately selected depending on the purpose. The tire is excellent in abrasion resistance and low heat generation property due to the use of the rubber composition containing the conjugated diene polymer of the present invention.

The portion of the tire, to which the rubber composition of the present invention is applied, is not particularly limited and may be appropriately selected depending on the purpose. Examples thereof include a tread, a base tread, a side wall, side reinforcing rubber, and a bead filler.

The method used for producing the tire may be an ordinary method. For example, the members generally used for producing the tire, such as a carcass layer, a belt layer, and a tread layer, each formed of the rubber composition of the present invention and a code are sequentially adhered on a tire molding drum, and the drum is withdrawn to form a green tire. The green tire is crosslinked (vulcanized) by heating by an ordinary method, so as to provide a target tire (such as a pneumatic tire).

EXAMPLES

The present invention will be described in more detail with reference to examples, but the present invention is not limited to the examples.

<Synthesis of Polymers A to K>

(Polymer A)

Under a nitrogen atmosphere, 187.4 g of cyclohexane and 279.3 g of a cyclohexane solution (25.07% by mass) of 1,3-butadiene were sequentially added to a polymerization bottle, and then 0.194 mL (0.30 mmol) of a hexane solution of n-butyl lithium (1.55 mol/L) as a polymerization initiator was added thereto at room temperature to start polymerization (the addition amount of the randomizer with respect to the addition amount of the polymerization initiator: 0 molar equivalent). Thereafter, the reaction was performed in a water bath at 50° C. for 80 minutes with a rotary polymerization tank. The polymerization bottle was once taken out, to which 0.421 mL of a cyclohexane solution (0.5 mol/L) of 2,2-di(2-tetrahydrofuryl)propane as a randomizer (0.21 mmol, 0.7 molar equivalent with respect to the addition amount of the polymerization initiator) was added at room temperature, and then again mounted on the rotary polymerization tank, and the reaction was performed in a water bath at 50° C. for 40 minutes. After completing the reaction, 3 mL of 2-propanol deaerated with nitrogen was added to the polymerization bottle, and subsequently the resulting cement was poured into 500 mL of 2-propanol. The white precipitate obtained at this time was separated from the solvent by filtration, and the resulting precipitate was rinsed by adding 500 mL of 2-propanol thereto, to which 0.2 mL of a 2-propanol solution (5% by mass) of 2,2'-methylenebis (4-ethyl-6-t-butylphenol) (NS-5) was added as an antioxidant. The precipitate was again separated by filtration, and the remaining solvent was removed by placing in a vacuum dryer at 65° C. for 6 hours to provide 69.03 g of a polymer A.

(Polymer B)

A polymer B was obtained in the same manner as in the preparation of the polymer A except that the cyclohexane solution (0.5 mol/L) of 2,2-di(2-tetrahydrofuryl)propane was added after 75 minutes from the start of the polymerization, and then the reaction was further performed for 40 minutes.

(Polymer C)

A polymer C was obtained in the same manner as in the preparation of the polymer A except that the cyclohexane solution (0.5 mol/L) of 2,2-di(2-tetrahydrofuryl)propane was added after 70 minutes from the start of the polymerization, and then the reaction was further performed for 40 minutes.

(Polymer D)

A polymer D was obtained in the same manner as in the preparation of the polymer A except that the cyclohexane solution (0.5 mol/L) of 2,2-di(2-tetrahydrofuryl)propane was added after 60 minutes from the start of the polymerization, and then the reaction was further performed for 30 minutes.

(Polymer E)

A polymer E was obtained in the same manner as in the preparation of the polymer A except that the cyclohexane solution (0.5 mol/L) of 2,2-di(2-tetrahydrofuryl)propane was added after 30 minutes from the start of the polymerization, and then the reaction was further performed for 60 minutes.

(Polymer F)

A polymer F was obtained in the same manner as in the preparation of the polymer A except that the cyclohexane solution (0.5 mol/L) of 2,2-di(2-tetrahydrofuryl)propane was not added, and the reaction was performed for 120 minutes.

(Polymer G)

A polymer G was obtained in the same manner as in the preparation of the polymer A except that the amount of the cyclohexane solution (0.5 mol/L) of 2,2-di(2-tetrahydrofury0propane was changed to 0.060 mL (0.03 mmol, 0.1 molar equivalent with respect to the addition amount of the polymerization initiator), and added immediately before the addition of n-butyl lithium at room temperature, and the reaction was performed for 90 minutes.

(Polymer H)

A polymer H was obtained in the same manner as in the preparation of the polymer A except that the amount of the cyclohexane solution (0.5 mol/L) of 2,2-di(2-tetrahydrofuryl)propane was changed to 0.305 mL (0.15 mmol, 0.51 molar equivalent with respect to the addition amount of the polymerization initiator), the solution was added immediately before the addition of n-butyl lithium at room temperature, and the reaction was performed for 90 minutes.

(Polymer I)

A polymer I was obtained in the same manner as in the preparation of the polymer A except that the cyclohexane solution (0.5 mol/L) of 2,2-di(2-tetrahydrofuryl)propane was added by dividing into two stages, in which in the first stage, 0.086 mL thereof (0.043 mmol, 0.14 molar equivalent with respect to the addition amount of the polymerization initiator) was added immediately before the addition of n-butyl lithium at room temperature, and in the second stage, after reacting at 50° C. for 30 minutes, 0.335 mL thereof (0.17 mmol, 0.56 molar equivalent with respect to the addition amount of the polymerization initiator) was added, and after the addition of the second stage, the reaction was performed for 40 minutes.

(Polymer J)

A polymer J was obtained in the same manner as in the preparation of the polymer A except that the cyclohexane solution (0.5 mol/L) of 2,2-di(2-tetrahydrofuryl)propane was added after 45 minutes from the start of the polymerization, the addition amount thereof was changed to 0.241 mL (0.12 mmol, 0.4 molar equivalent with respect to the addition amount of the polymerization initiator), and then the reaction was further performed for 40 minutes.

(Polymer K)

A polymer K was obtained in the same manner as in the preparation of the polymer A except that the cyclohexane solution (25.07% by mass) of 1,3-butadiene and the cyclohexane solution (0.5 mol/L) of 2,2-di(2-tetrahydrofuryl)propane were added by dividing into two stages, in which in the first stage, 178.0 g of the 1,3-butadiene solution and 0.030 mL of the 2,2-di(2-tetrahydrofuryl)propane solution (0.015 mmol, 0.05 molar equivalent with respect to the addition amount of the polymerization initiator) were added before the start of the polymerization, and in the second stage, after reacting at 50° C. for 100 minutes, 9.4 g of the 1,3-butadiene solution and 0.81 mL of the 2,2-di(2-tetrahydrofuryl)propane solution (0.405 mmol, 1.35 molar equivalent with respect to the addition amount of the polymerization initiator) were added, and after the addition of the second stage, the reaction was performed for 15 minutes.

<Structure of Polymer>

The number average molecular weight (Mn), the average vinyl content, the vinyl content of the low vinyl portion, the vinyl content of the high vinyl portion, and the proportion of the high vinyl portion of the polymer thus synthesized were obtained in the following manners. The results are shown in Table 1.

1. Number Average Molecular Weight (Mn)

The number average molecular weight was obtained in terms of standard polystyrene conversion value by performing gel permeation chromatography (GPC) measurement under the following condition.

(GPC Measurement Condition)

Column: "TSKgel G4000HXL" (trade name)×2, produced by Tosoh Corporation (column temperature: 40° C.)

Mobile phase: tetrahydrofuran (flow rate: 1 mL/min)

Detector: differential refractometer (to which a multi-wavelength detector (detection wavelength: 254 nm) was further connected)

Standard substance: TSK Standard Polystyrene, produced by Tosoh Corporation

Sample concentration: 0.06% by mass

2. Average Vinyl Content

The average vinyl content of the polymer was obtained by calculating the integrated ratio of the $^1$H-NMR spectrum.

3. Vinyl Content of Low Vinyl Portion, Vinyl Content of High Vinyl Portion, and Proportion of High Vinyl Portion In the synthesis of the polymer, assuming that after the start of the polymerization, the portion formed before the addition of the randomizer was the low vinyl portion, and the portion formed after the addition was the high vinyl portion, and the values were calculated in the following manner.

During the polymerization reaction before the addition of the randomizer, a small amount of the cement was collected from the bottle, the conversion (S %) of the 1,3-butadiene monomer at this time was calculated by the gravimetric method, and the vinyl content (i.e., the vinyl content of the low vinyl portion) (s %) was obtained by $^1$H-NMR. Thereafter, the randomizer was added, then the final conversion (F %) of 1,3-butadiene and the average vinyl content (f %) obtained by $^1$H-NMR were determined. Subsequently, the values of S, F, s, and f obtained above were substituted into the following expressions, so as to calculate the proportion (L %) of the low vinyl portion (having a vinyl content of s %), the proportion (H %) of the high vinyl portion, and the vinyl content (h %) thereof were calculated.

$$\text{Proportion } L \text{ of low vinyl portion} = 100 \times S/F$$

$$\text{Proportion } H \text{ of high vinyl portion} = 100 - L$$

$$\text{Vinyl content } h \text{ of high vinyl portion} = ((100 \times f) - (L \times s))/H$$

<Preparation of Rubber Composition and Production of Crosslinked Rubber>

(Preparation of Rubber Composition)

According to the formulation shown in the column "First stage of kneading" in Table 1, the polymer, the oil, the carbon black, the silica, the silane coupling agent, stearic acid, and the antiaging agent are kneaded with a Banbury mixer at a starting temperature of 110° C. and a rotation rate of 70 rpm. Thereafter, according to the formulation shown in the column "Second stage of kneading" in Table 1, zinc oxide, the vulcanization accelerator, and sulfur are kneaded to prepare the rubber compositions of Examples and Comparative Examples.

(Production of Crosslinked Rubber)

The resulting rubber composition is vulcanized under the vulcanization condition of 160° C. for 20 minutes to provide crosslinked rubber (vulcanized rubber) of Examples and Comparative Examples.

<Evaluation Methods>

1. Low Heat Generation Property

The crosslinked rubber of Examples and Comparative Examples is measured for tan δ with a dynamic spectrometer under conditions of a tensile dynamic strain of 10% and a frequency of 15 Hz at 50° C. The following linear function expression showing the relationship between tan δ and the average vinyl content is calculated from the results of Comparative Examples 1 to 3 by the least square method.

Linear function expression of tan δ and average vinyl content in Comparative Examples 1 to 3:

$$(\tan \delta) = A \times (\text{average vinyl content}) + B \text{ (wherein } A \text{ and } B \text{ are constants)}$$

The average vinyl content of Examples and Comparative Examples is substituted into the linear function expression to calculate the (assumed tan δ), which is standardized as a low heat generation index according to the following expression.

(Low heat generation index)=((assumed tan δ)/(measured tan δ))×100

A larger low heat generation index means that the crosslinked rubber has better low heat generation property.

2. Abrasion Resistance

The crosslinked rubber of Examples and Comparative Examples is measured for the abrasion loss according to JIS K6264-2:2005 with a Lambourn abrasion tester with a slip ratio of 60% at 40° C. The following linear function expression showing the relationship between the abrasion loss and the vinyl content is calculated from the results of Comparative Examples 1 to 3 by the least square method.

Linear function expression of abrasion loss and average vinyl content in Comparative Examples 1 to 3:

(abrasion loss)=$A$×(average vinyl content)+$B$(wherein $A$ and $B$ are constants)

The average vinyl content of Examples and Comparative Examples is substituted into the linear function expression to calculate the (assumed abrasion loss), which is standardized as an abrasion resistance index according to the following expression.

(Abrasion resistance index)=((assumed abrasion loss)/(measured abrasion loss))×100

A larger abrasion resistance index means that the crosslinked rubber has better abrasion resistance.

<Details of Components in Table>

(1) Polymers A to K: Polymers produced by synthesis methods described (2) SBR: Styrene-butadiene copolymer, "#1502", produced by JSR Corporation (3) Oil: "JOMO Process NC300BN", produced by JX Nippon Oil & Energy Corporation (4) Carbon black: "Seast 7HM", produced by Tokai Carbon Co., Ltd.

(5) Silica: "Nipsil AQ", produced by Tosoh Silica Corporation (6) Silane coupling agent: "ABC-856", produced by Shin-Etsu Chemical Co., Ltd.

(7) Antiaging agent: "Nocrac 6C", produced by Ouchi Shinko Chemical Industrial Co., Ltd.

(8) Vulcanization accelerator DPG: "Nocceler D", produced by Ouchi Shinko Chemical Industrial Co., Ltd.

(9) Vulcanization accelerator DM: "Nocceler DM-P", produced by Ouchi Shinko Chemical Industrial Co., Ltd.

(10) Vulcanization accelerator NS: "Nocceler NS-P", produced by Ouchi Shinko Chemical Industrial Co., Ltd.

It is apparent from Table 1 that the crosslinked rubber of Examples using the polymers A to E and K having a low vinyl portion having a vinyl content of 2 to 20% by mol, and a high vinyl portion having a vinyl content of 50% by mol or more is excellent in both low heat generation property and abrasion resistance.

Accordingly, the use of the conjugated diene polymer of the present invention having a low vinyl portion having a vinyl content of 2 to 20% by mol, and a high vinyl portion

TABLE 1

| | | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|---|---|
| First stage of kneading | Rubber component | Polymer A | 50 | | | | | | | | | | | |
| | | Polymer B | | 50 | | | | 70 | | | | | | |
| | | Polymer C | | | 50 | | | | | | | | | |
| | | Polymer D | | | | 50 | | | | | | | | |
| | | Polymer E | | | | | 50 | | | | | | | |
| | | Polymer F | | | | | | | | 50 | | | | |
| | | Polymer G | | | | | | | | | 50 | | | |
| | | Polymer H | | | | | | | | | | 50 | | |
| | | Polymer I | | | | | | | | | | | 50 | |
| | | Polymer J | | | | | | | | | | | | 50 |
| | | Polymer K | | | | | | | 50 | | | | | |
| | | SBR | 50 | 50 | 50 | 50 | 50 | 30 | 50 | 50 | 50 | 50 | 50 | 50 |
| | | Oil | 10 | 10 | 10 | 10 | 10 | 10 | 10 | 10 | 10 | 10 | 10 | 10 |
| | | Carbon black | 10 | 10 | 10 | 10 | 10 | 10 | 10 | 10 | 10 | 10 | 10 | 10 |
| | | Silica | 70 | 70 | 70 | 70 | 70 | 70 | 70 | 70 | 70 | 70 | 70 | 70 |
| | | Silane coupling agent | 5.6 | 5.6 | 5.6 | 5.6 | 5.6 | 5.6 | 5.6 | 5.6 | 5.6 | 5.6 | 5.6 | 5.6 |
| | | Stearic acid | 2 | 2 | 2 | 2 | 2 | 2 | 2 | 2 | 2 | 2 | 2 | 2 |
| | | Antiaging agent | 1 | 1 | 1 | 1 | 1 | 1 | 1 | 1 | 1 | 1 | 1 | 1 |
| Second stage of kneading | | Zinc oxide | 3 | 3 | 3 | 3 | 3 | 3 | 3 | 3 | 3 | 3 | 3 | 3 |
| | | Vulcanization accelerator DPG | 0.5 | 0.5 | 0.5 | 0.5 | 0.5 | 0.5 | 0.5 | 0.5 | 0.5 | 0.5 | 0.5 | 0.5 |
| | | Vulcanization accelerator DM | 0.5 | 0.5 | 0.5 | 0.5 | 0.5 | 0.5 | 0.5 | 0.5 | 0.5 | 0.5 | 0.5 | 0.5 |
| | | Vulcanization accelerator NS | 0.5 | 0.5 | 0.5 | 0.5 | 0.5 | 0.5 | 0.5 | 0.5 | 0.5 | 0.5 | 0.5 | 0.5 |
| | | Sulfur | 1.2 | 1.2 | 1.2 | 1.2 | 1.2 | 1.2 | 1.2 | 1.2 | 1.2 | 1.2 | 1.2 | 1.2 |
| Structure of polymer | | Mn (k) | 391 | 395 | 378 | 411 | 377 | 395 | 403 | 392 | 394 | 394 | 402 | 394 |
| | | Average vinyl content (% by mol) | 9 | 10 | 15 | 21 | 39 | 10 | 19 | 7 | 19 | 45 | 42 | 22 |
| | | Vinyl content in low vinyl portion (% by mol) | 7 | 7 | 7 | 7 | 7 | 7 | 16 | — | — | — | 25 | 8 |
| | | Vinyl content in high vinyl portion (% by mol) | 63 | 63 | 63 | 63 | 63 | 63 | 74 | — | — | — | 63 | 45 |
| | | Proportion of high vinyl portion (% by mol) | 2 | 5 | 10 | 23 | 57 | 5 | 5 | — | — | — | 45 | 38 |
| Evaluation | | Low heat generation property | 112 | 108 | 105 | 103 | 101 | 115 | 106 | 100 | 100 | 100 | 95 | 98 |
| | | Abrasion resistance | 104 | 110 | 106 | 103 | 102 | 118 | 107 | 100 | 100 | 100 | 98 | 97 | having a vinyl content of 50% by mol or more in a tire can provide a tire that is excellent in low fuel consumption capability and is also excellent in abrasion resistance.

The invention claimed is:

1. A conjugated diene polymer comprising: a low vinyl portion having a vinyl content of 2 to 20% by mol; and a high vinyl portion having a vinyl content of 50% by mol or more;
wherein the conjugated diene polymer contains the high vinyl portion in an amount of more than 0% by mol and 10% by mol or less, the average vinyl content of the conjugated diene polymer is from 7 to 20% by mol, a number average molecular weight (Mn) of the conjugated diene polymer is within the range of 378,000 and 1,000,000.

2. The conjugated diene polymer according to claim 1, wherein the conjugated diene polymer contains the low vinyl portion in an amount of 80% by mol or more and less than 100% by mol.

3. The conjugated diene polymer according to claim 1, wherein the conjugated diene polymer has the high vinyl portion at a molecular end.

4. The conjugated diene polymer according to claim 1, wherein the low vinyl portion contains a structure derived from butadiene.

5. The conjugated diene polymer according to claim 1, having a number average molecular weight (Mn) of from 378,000 to 500,000.

6. The conjugated diene polymer according to claim 1, wherein the vinyl content of the high vinyl portion is from 60 to 75 mol %.

7. The conjugated diene polymer according to claim 1, wherein the vinyl content of the low vinyl portion is from 3 to 18 mol %.

8. The conjugated diene polymer according to claim 1, comprising the high vinyl portion in an amount of from 2 to 8% by mol.

* * * * *